United States Patent
Galal et al.

(10) Patent No.: US 7,725,895 B2
(45) Date of Patent: May 25, 2010

(54) PROCESSOR CONTROL REGISTER VIRTUALIZATION TO MINIMIZE VIRTUAL MACHINE EXITS

(75) Inventors: Gehad Galal, Rancho Cordova, CA (US); Randolph Campbell, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1819 days.

(21) Appl. No.: 10/813,896

(22) Filed: Mar. 31, 2004

(65) Prior Publication Data

US 2005/0223377 A1 Oct. 6, 2005

(51) Int. Cl.
*G06F 9/46* (2006.01)
*G06F 9/455* (2006.01)
(52) U.S. Cl. .......................... 718/100; 718/1
(58) Field of Classification Search .............. 718/100, 718/1
See application file for complete search history.

(56) References Cited

U.S. PATENT DOCUMENTS

| | | | | | |
|---|---|---|---|---|---|
| 4,298,935 | A | * | 11/1981 | Lange et al. | 714/31 |
| 6,944,699 | B1 | * | 9/2005 | Bugnion et al. | 710/269 |
| 7,218,634 | B1 | * | 5/2007 | Khalil et al. | 370/392 |
| 7,251,815 | B2 | * | 7/2007 | Donovan et al. | 718/105 |
| 2004/0117532 | A1 | * | 6/2004 | Bennett et al. | 710/260 |

* cited by examiner

*Primary Examiner*—Thomas Lee
*Assistant Examiner*—Mengyao Zhe
(74) *Attorney, Agent, or Firm*—Blakely, Sokoloff, Taylor & Zafman LLP

(57) ABSTRACT

Writing a control flag in a processor control register by a guest virtual machine. Determine whether the control flag is owned by the guest virtual machine. Write the control flag to the processor control register if the control flag is owned by the guest virtual machine. Write the control flag to a shadow location if the control flag is not owned by the guest virtual machine.

24 Claims, 4 Drawing Sheets

PROCESSOR CONTROL REGISTER VIRTUALIZATION TO MINIMIZE VIRTUAL MACHINE EXITS

BACKGROUND

A Virtual Machine (VM) is an efficient, isolated duplicate of a real computer system. More than one VM may be provided concurrently by a single real system. A real system may have a number of resources that it provides to an operating system or application software for use. The central processing unit (CPU), also referred to as the processor, and motherboard chipset may provide a set of instructions and other foundational elements for processing data, memory allocation, and input/output (I/O) handling. The real system may further include hardware devices and resources such as memory, video, audio, disk drives, and ports (universal serial bus, parallel, serial). In a real system, the basic I/O system (BIOS) provides a low level interface that an operating system can use to access various motherboard and I/O resources. With a real system, when an operating system accesses a hardware device, it typically communicates through a low-level device driver that interfaces directly to physical hardware device memory or I/O ports.

When a system is hosting a virtual machine environment, one or more guest software applications may be executed by the CPU in such a manner that each guest software application (guest) can execute as though it were executing with exclusive control of the system. This may require that the CPU execute a Virtual Machine Monitor (VMM) along with the guest to prevent the guest from altering the state of the system in a way that would conflict with the execution of other guests. The VMM may referred to as the monitor. The VMM may be provided as software, firmware, hardware, or a combination of two or more of these.

The VMM may place the processor in a mode where execution of certain instructions that could alter the state of the CPU and create conflicts with other guests will trap execution of the instruction and pass control to the VMM. Instructions which are trapped may be called privileged instructions. The VMM is then able to handle the guest attempt to execute a privileged instruction in a manner that makes the trapping of the instruction transparent to the guest while preventing the processor from being placed in a state that interferes with the execution of other guests. When a guest executes privileged instructions that inspect or modify hardware state, which appear to the guest to be directly executing on the hardware, the privileged instructions are instead virtualized by the VM and passed to the VMM.

When a trap to the VMM occurs, the VMM may save the state of the processor as it was when the privileged instruction was executed by the guest. The VMM may then restore the state of the processor to what it should be after execution of the privileged instruction before control is returned to the guest. The trap from guest to VMM is referred to as a VMEXIT. The monitor may resume the guest with either of a VMRESUME or a VMLAUNCH instruction, which may be collectively referred to as a VMENTER. The time taken by a VMEXIT and VMENTER pair is referred to as the Exit-Enter Time (EET).

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
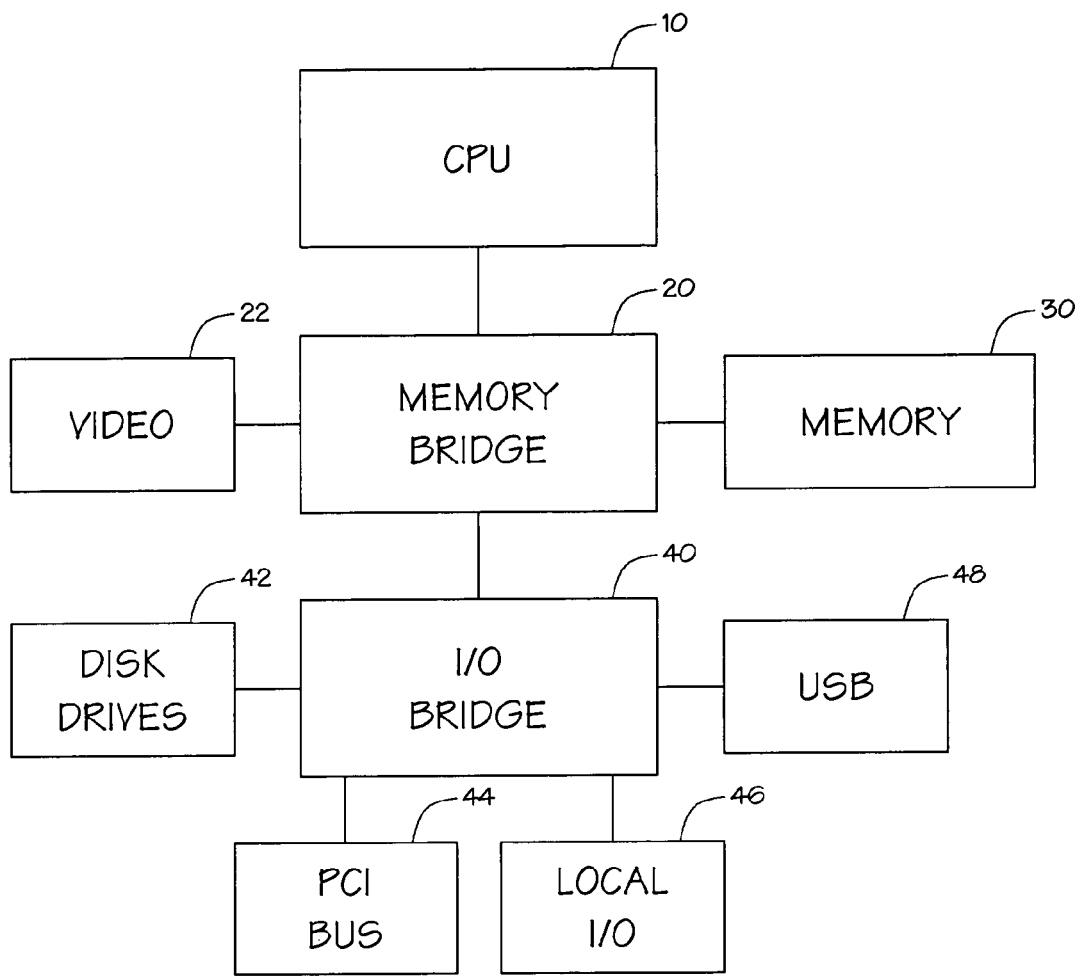
FIG. 1 is a block diagram of an embodiment the invention.

As shown in FIG. 1, a computer system may include a central processing unit (CPU) 10, also referred to as a processor, coupled to a random access memory (RAM) 30. A memory bridge 20 may couple the processor 10 to the memory 30. The RAM may be any of a variety of types of memory such as synchronous dynamic random access memory (SDRAM), RAMBUS® dynamic random access memory (RDRAM), or extended data out random access memory (EDO RAM).

The computer system may include a number of devices that are coupled to the processor 10. A video device 22 may provide a visual display that may receive data from the processor 10 through the memory bridge 20. The memory bridge may also be coupled to an I/O bridge 40. The I/O bridge may be coupled in turn to various devices such as disk drives 42, a Peripheral Component Interconnect (PCI) bus 44 that support various expansion cards, local I/O devices 46 such as timers and power control devices, and Universal Serial Bus (USB) 48 connectors.

The RAM 30 may be loaded with data that represents executable instructions that may be executed by the processor 10. The RAM 30 may further contain locations that are defined to the processor 10 to contain data structures used by the processor to control the execution of the processor such as pointers to routines to be executed when certain conditions are detected, data structures such as push down stacks to temporarily hold data being used by the processor, and other data structures to define the processing environment such as task contexts. It will be understood that the amount of RAM 30 accessible by the processor 10 may exceed the amount of RAM that is physically present in the computer system. Various memory management techniques may be used to manipulate the contents of the physical RAM 30 so that it appears to the processor 10 that all of the accessible RAM is present. The contents of the RAM 30 will be described as though all accessible RAM is physically present to avoid obscuring the operation of the described embodiments of the invention but it should be understood that the structures described as being in memory may not all be in physical memory concurrently and that different memory structures may occupy the same physical memory successively while remaining logically distinct.

Figure 2:
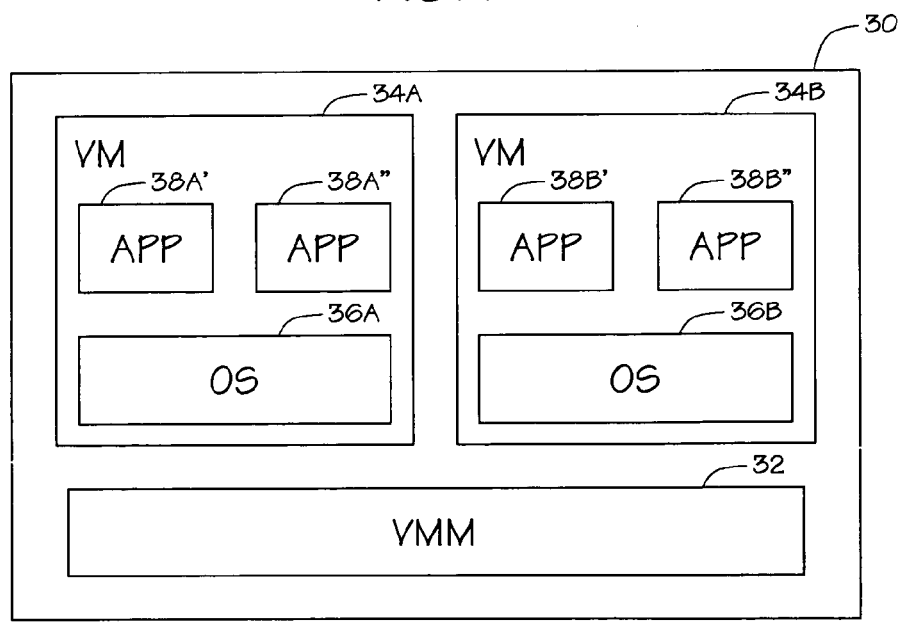
FIG. 2 is a layout of data in a random access memory in the embodiment the invention shown in FIG. 1.

The processor 10 may be used to host one or more virtual machines (VMs). As shown in FIG. 2, a portion of RAM 30 may be assigned to each virtual machine 34 as a virtual machine context. The assigned portion of RAM 30 may be all or part of the RAM available to the processor 10. The assigned portion of RAM 30 may be loaded and unloaded as required to allow one virtual machine 34A to use some or all of the physical RAM assigned to another virtual machine 34B. The RAM 30 may support a virtual memory system to manage the use of the RAM so that each virtual machine 34A is able to use the RAM without regard to other virtual machines 34B that might also be hosted by the processor 10. The processor may host a Virtual Machine Monitor (VMM) 32 to manage the one or more virtual machines 34. The VMM 32 may trap the execution of certain instructions by the virtual machines 34 so that each virtual machine 34A is able to operate without regard to other virtual machines 34B that might also be hosted by the processor 10.

Each virtual machine 34A provides an environment for the execution of software that appears to be a dedicated physical machine that is protected and isolated from other virtual machines 34B. While only two virtual machines are shown, it is to be understood that any number of virtual machines may be hosted by the processor used in embodiments of the invention. Each virtual machine 34 may have an operating system (OS) 36 and one or more application programs 38 that are executed by the OS. The OS 36 on each virtual machine 34 may be the same or different that the OS on other virtual machines.

Figure 3:
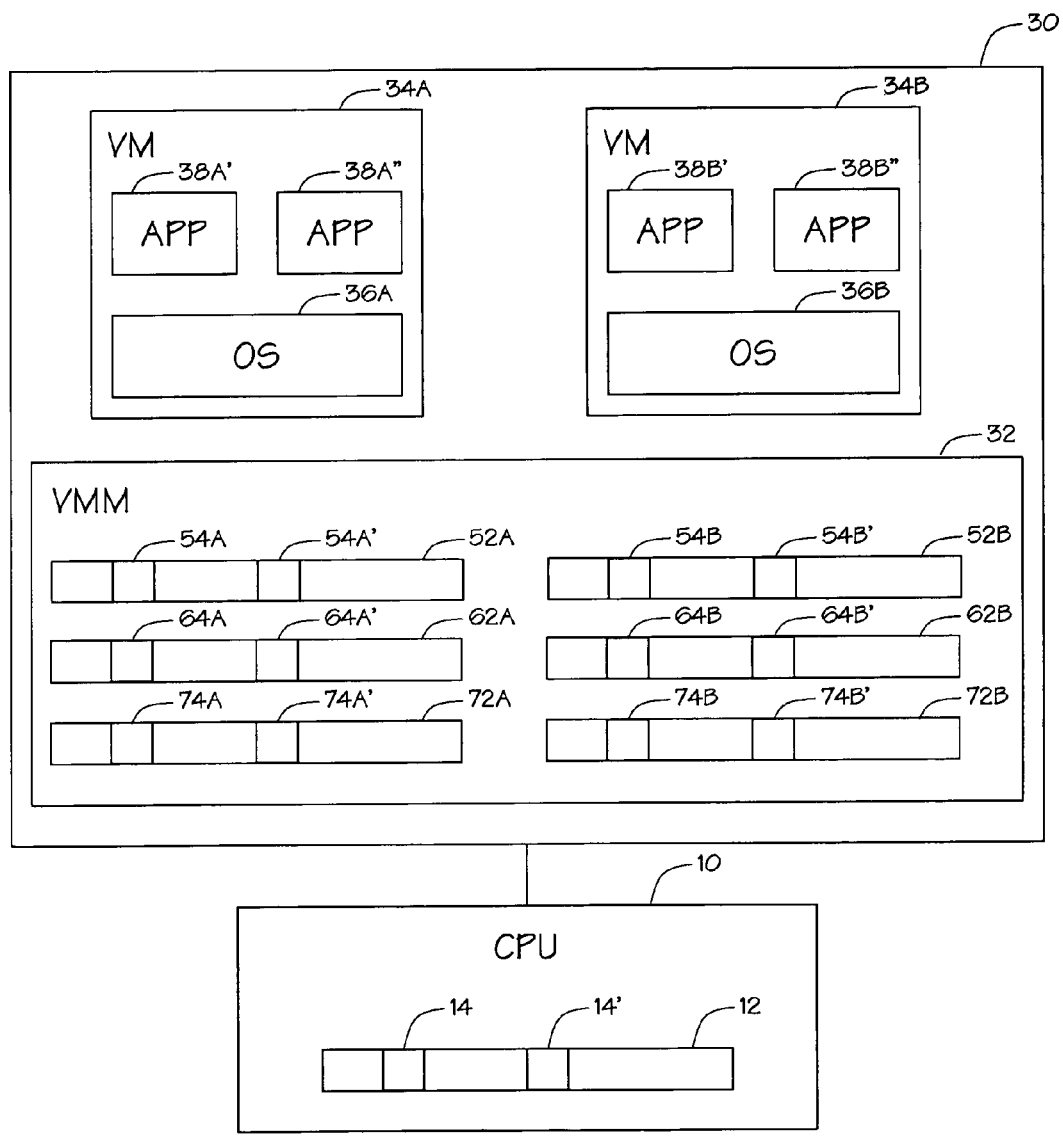
FIG. 3 is a block diagram showing details of the processor and memory in the embodiment the invention shown in FIG. 1.

As shown in FIG. 3, the processor 10 may include a control register 12 to determine the operating mode of the processor and the characteristics of a currently executing task. The control register 12 may be a predetermined location in memory 30 or a data storage location within the processor 10, as shown in FIG. 3. A control register 12, such as Control Register 0 (CR0) in an IA-32 Intel® Architecture processor 10, may include a flag 14 to indicate a state of the processor, such as the Task Switched (TS) bit 3 of CR0 which indicates that task switching has occurred. Another exemplary processor state flag 14' is a flag to indicate whether coprocessor exceptions should be monitored, such as the Monitor Coprocessor (MP) bit 1 of CR0.

If a Virtual Machine Monitor (VMM) 32 is executing on a CPU 10 that includes a control register 12, the VMM may need to virtualize one or more of the flags 14 maintained in the control register. If software with a virtual machine context 34A executes an instruction to write a virtualized flag 14, the instruction may be trapped to the VMM 32. When a trap to the VMM occurs, the VMM may save the processor state on entry to the VMM and restore the state of the processor 10 on exit to the guest context 34A. The time taken to save and restore state is referred to as the Exit-Enter Time (EET). The EET may represent a substantial overhead for writing a flag 14.

Embodiments of the invention may provide shadow locations 52 associated with each of the virtual machines 34 that can maintain virtualized flags 54 that may be written by a guest 36 without incurring the EET overhead. When a guest virtual machine 34A attempts to write a control flag 14 in a processor control register 12, it is determined whether the control flag is owned by the guest virtual machine 34A. If the flag 14 is owned by the guest 34A, writing the control flag to the processor control register 12 will not interfere with other guest virtual machines 34B and the writing may proceed as attempted by the guest 34A.

If the flag 14 is not owned by the guest 34A, then the writing of the flag may be virtualized to avoid interfering with other guest virtual machines 34B. If the control flag 14 is not owned by the guest virtual machine 34A the control flag is written to the shadow location 54A rather than the processor control register 12. This may save the EET overhead because the VMM 32 may not need to save state to cause the guest control flag write instruction to be redirected to the shadow location 52A. A first flag 64A in a first mask word 62A associated with the guest virtual machine 34A may be tested to determine whether the control flag 14 is owned by the guest virtual machine.

In one embodiment of the invention, it is determined whether the control flag 14 is maintained in a shadow location 54A. In another embodiment of the invention, this determination may be made only if the control flag 14 is not owned by the guest virtual machine 34A. If the control flag 14 is not owned by the guest virtual machine 34A and is maintained in the shadow location 54A, the write of the control flag is redirected to the shadow location. If the control flag 14 is not owned by the guest virtual machine 34A and is not maintained in the shadow location 54A, then an exit to the VMM 32 is required for writing the control flag to the processor control register 12. This may incur the EET overhead. A second flag 74A in a second mask word 72A associated with the guest virtual machine 34A may be tested to determine whether the control flag 14 is maintained in a shadow location. In one embodiment of the invention, the first flag 64 and the second flag 74 may be maintained in the same word.

To read the control flag 14, it may be determined whether the control flag is maintained in a shadow location 52. The flag may then be read from the shadow location 52 or from the processor control register 12 as appropriate. In one embodiment of the invention, a first flag 64 in a first mask word 62 associated with the guest virtual machine 34 may be tested to determine whether the control flag 14 is owned by the guest virtual machine and thereby determine that the control flag is maintained in a shadow location 52 if the control flag is not owned by the guest virtual machine. In another embodiment of the invention, a second flag 74 in a second mask word 72 associated with the guest virtual machine 34 may be tested to determine whether the control flag 14 is maintained in a shadow location 52. In some embodiments of the invention, there may be both first and second flags and it may be possible to determine whether the control flag 14 is maintained in a shadow location 52 by testing only the second flag.

Figure 4:
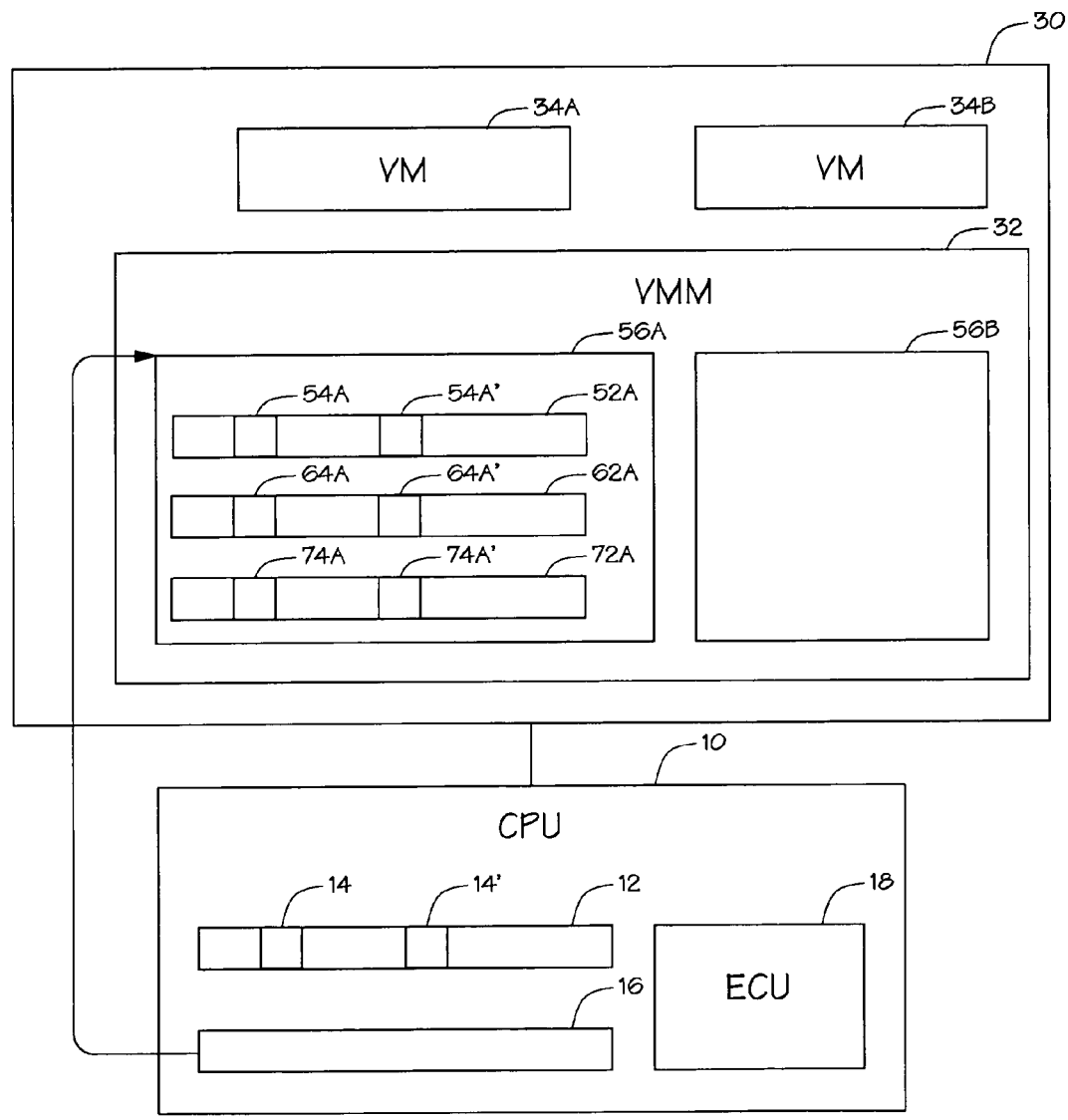
FIG. 4 is a block diagram showing further details of the processor and memory in the embodiment the invention shown in FIG. 1.

The foregoing methods may be carried out by the processor 10 trapping the reads and writes of the control register 12 and passing control to the VMM 32 to determine the appropriate actions. In another embodiment as shown in FIG. 4, the processor 10 may have an execution control unit 18 that may perform some or all of the foregoing methods before passing control to the VMM or without the need to pass control to the VMM.

In one embodiment, the processor 10 may include a VM pointer 16 to a guest virtual machine context 56 for the currently executing virtual machine 34. The VMM may provide a context area in RAM 30 for each virtual machine 34 being hosted by the processor 10. The VMM may load the address of the guest virtual machine context 56 into the VM pointer 16 before passing control to the virtual machine 34. The processor 10 may use the VM pointer 16 to access memory locations 52, 62, 72 that provide data about the state of the executing virtual machine 34.

When a guest virtual machine 34A issues a write to the control flag 14 in the processor control register 12, the processor 10 may test a first flag 64A in a first mask word 62A in the guest virtual machine context 56A. If the first flag 64A indicates that the control flag 14 is not owned by the guest virtual machine 34A associated with the guest virtual machine context 56A, then the execution control unit 18 causes the write of the control flag 14 by the guest virtual machine to be redirected to the shadow location 52A in the guest virtual machine context 56A.

In another embodiment, the processor 10 further tests a second flag 74A in the guest virtual machine context 56A. If the second flag 74A indicates the control flag 14 is maintained in the shadow location 52A and the first flag 64A indicates that the control flag is not owned by the guest virtual machine 34A, then the execution control unit 18 causes the write of the control flag 14 by the guest virtual machine to be redirected to the shadow location 52A in the guest virtual machine context 56A. If the control flag 14 is not owned by the guest virtual machine 34A and is not maintained in the shadow location 52A, then the execution control unit 18 causes an exit to a virtual machine monitor 32.

In another embodiment, the execution control unit 18 is responsive to the second flag 74A only if the first flag 64A indicates that the control flag 14 is not owned by the guest virtual machine 34A. The second flag 74A may be ignored or may not be accessed or tested if the first flag 64A indicates that the control flag 14 is owned by the guest virtual machine 34A.

Figure 5:
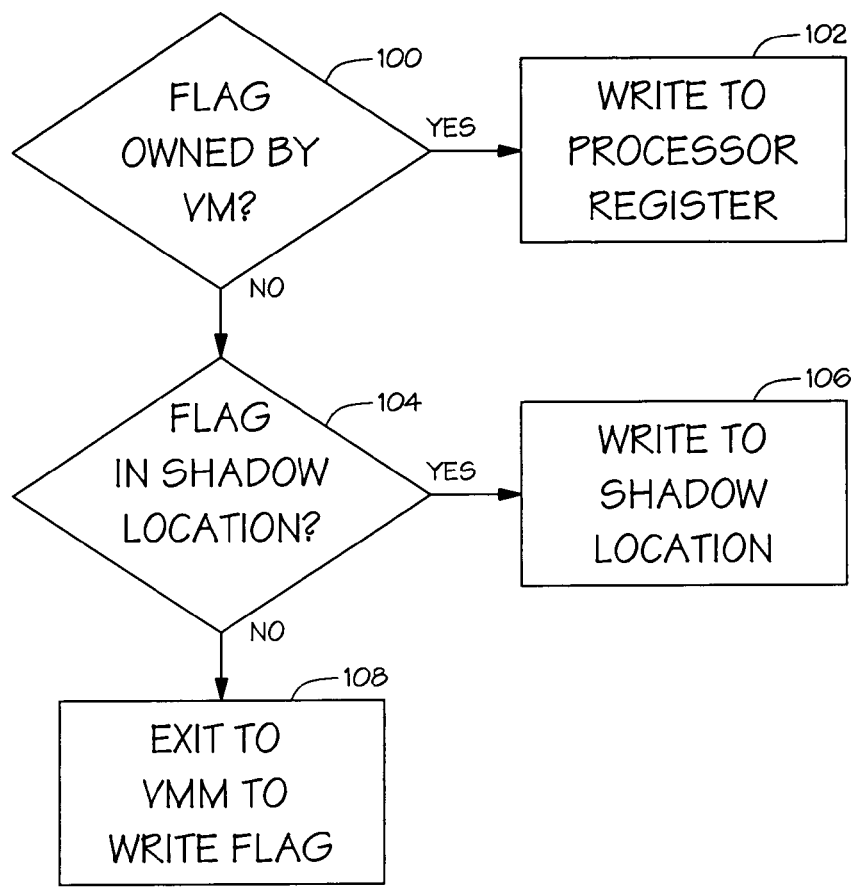
FIG. 5 is a flow chart for writing of a flag.

FIG. 5 is a flowchart of a method for writing a control flag 14 in a processor control register 12 by a guest virtual machine 34. When the guest virtual machine 34 attempts to write the control flag 14, it is determined whether the control flag is owned by the guest virtual machine 100. A first flag 64 in a first mask word 62 may be tested to determine whether the control flag is owned by the guest virtual machine. If the control flag 14 is owned by the guest virtual machine 34, the virtual machine may be permitted to write the control flag to the processor control register 102. It may be further determined whether the control flag 14 is maintained in a shadow location 104. A second flag may be tested to determine whether the control flag is maintained in the shadow location. If the control flag is maintained in the shadow location, the control flag may be written to the shadow location 106. If the control flag is not owned by the guest virtual machine and is not maintained in the shadow location, there may be an exit to a virtual machine monitor to process the attempted writing of the control flag by the virtual machine 108.

Figure 6:
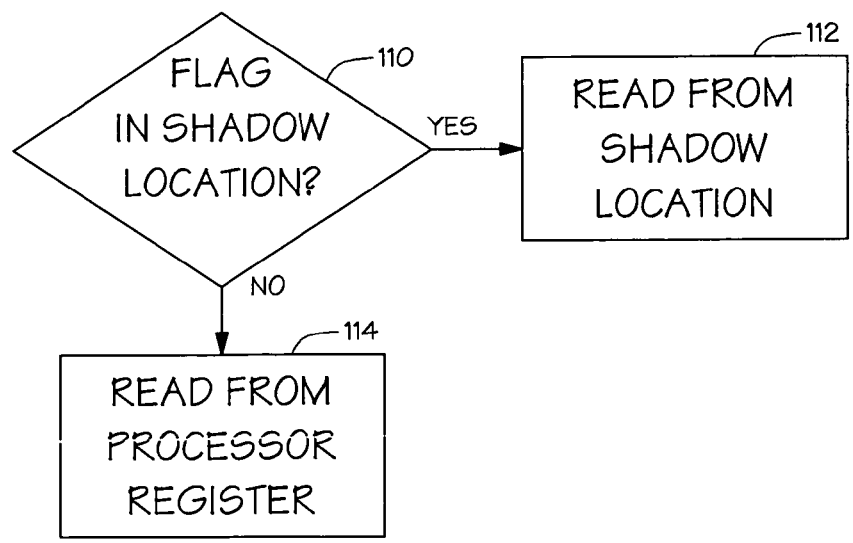
FIG. 6 is a flow chart for reading of a flag.

FIG. 6 is a flowchart of a method for reading a control flag 14 in a processor control register 12 by a guest virtual machine 34. When the guest virtual machine 34 attempts to read the control flag 14, it is determined whether the control flag is maintained in a shadow location 110. If the control flag 14 is maintained in the shadow location 52, the control flag may be read from the shadow location 112. A flag in a mask word may be tested to determine whether the control flag is maintained in the shadow location. If the control flag 14 is not maintained in the shadow location 52, the control flag may be read from the processor control register 114.

It will be appreciated that embodiments of the invention may be in the form of an article of manufacture that includes a machine-accessible medium. The machine-accessible medium may include data that, when accessed by a processor 10, cause the processor to perform operations. Thus, a machine-accessible medium includes any mechanism that provides stores information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.).

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for setting an operating mode of a processor by writing a control flag included in a processor control register of the processor by a guest virtual machine, the method comprising:
   determining whether the control flag is owned by the guest virtual machine;
   writing the control flag to the processor control register if the control flag is owned by the guest virtual machine; and
   writing the control flag to a shadow location in a guest virtual machine context in a memory coupled to the processor if the control flag is not owned by the guest virtual machine.

2. The method of claim 1, wherein determining whether the control flag is owned by the guest virtual machine further comprises testing a first flag in a mask word.

3. The method of claim 1, further comprising:
   determining whether the control flag is maintained in the shadow location;
   writing the control flag to the shadow location if the control flag is not owned by the guest virtual machine and is maintained in the shadow location; and
   exiting to a virtual machine monitor if the control flag is not owned by the guest virtual machine and is not maintained in the shadow location.

4. The method of claim 3, wherein determining whether the control flag is maintained in a shadow location is performed only if the control flag is not owned by the guest virtual machine.

5. The method of claim 3, wherein determining whether the control flag is maintained in a shadow location further comprises testing a flag.

6. A method for determining an operating mode of a processor by reading a control flag included in a processor control register of the processor by a guest virtual machine hosted by the processor, the method comprising:
   determining whether the control flag is maintained in a shadow location in a guest virtual machine context in a memory coupled to the processor;
   reading the control flag from the shadow location if the control flag is maintained in the shadow location; and
   reading the control flag from a processor control register of the processor if the control flag is not maintained in the shadow location.

7. The method of claim 6, wherein determining whether the control flag is maintained in a shadow location further comprises determining whether the control flag is owned by the guest virtual machine.

8. The method of claim 6, wherein determining whether the control flag is maintained in a shadow location further comprises testing a flag in a mask word.

9. A processor comprising:
   a processor control register that includes a control flag that determines an operating mode of the processor;
   a pointer to a guest virtual machine context in a portion of a random access memory (RAM) coupled to the processor;
   an execution control unit to test a first flag in the guest virtual machine context, the first flag to indicate whether the control flag is owned by a guest virtual machine associated with the guest virtual machine context, and
   to cause a write of the control flag by the guest virtual machine to be directed to the processor control register if the control flag is owned by the guest virtual machine and to be redirected to a shadow location in the guest virtual machine context if the control flag is not owned by the guest virtual machine.

10. The processor of claim 9, further comprising:
    a second mask word in the guest virtual machine context, the second mask word to include a second flag to indicate whether the control flag is maintained in the shadow location;
    wherein the execution control unit is further
       to cause a write of the control flag by the guest virtual machine to be redirected to the shadow location if the control flag is not owned by the guest virtual machine and is maintained in the shadow location, and to cause an exit to a virtual machine monitor if the control flag is not owned by the guest virtual machine and is not maintained in the shadow location.

11. The processor of claim 10, wherein the execution control unit is responsive to the second flag only if the first flag indicates that the control flag is not owned by the guest virtual machine.

12. A processor comprising:
a processor control register;
a control flag included in the processor control register, the control flag to determine an operating mode of the processor;
means for detecting the writing of the control flag by a guest virtual machine;
means for determining whether the control flag is owned by the guest virtual machine;
means for writing the control flag to the processor control register if the control flag is owned by the guest virtual machine; and
means for writing the control flag to a shadow location in a guest virtual machine context in a memory coupled to the processor if the control flag is not owned by the guest virtual machine.

13. The processor of claim 12, wherein means for determining whether the control flag is owned by the guest virtual machine further comprises means for testing a first flag in a mask word.

14. The processor of claim 12, further comprising:
means for determining whether the control flag is maintained in the shadow location;
means for writing the control flag to the shadow location if the control flag is not owned by the guest virtual machine and is maintained in the shadow location; and
means for exiting to a virtual machine monitor if the control flag is not owned by the guest virtual machine and is not maintained in the shadow location.

15. The processor of claim 14, wherein means for determining whether the control flag is maintained in a shadow location is operative only if the control flag is not owned by the guest virtual machine.

16. The processor of claim 14, wherein means for determining whether the control flag is at or maintained in a shadow location further comprises means for testing a flag.

17. An article of manufacture comprising:
a machine-accessible medium including data that, when accessed by a processor, cause the processor to perform operations comprising,
determining whether a control flag included in a processor control register of the processor is owned by a guest virtual machine, the control flag to determine an operating mode of the processor;
writing the control flag to a processor control register if the control flag is owned by the guest virtual machine; and
writing the control flag to a shadow location in a guest virtual machine context in a memory coupled to the processor if the control flag is not owned by the guest virtual machine.

18. The article of manufacture of claim 17 wherein the machine-accessible medium further includes data that cause the processor to perform operations comprising testing a first flag in a mask word to determine whether the control flag is owned by the guest virtual machine.

19. The article of manufacture of claim 17 wherein the machine-accessible medium further includes data that cause the processor to perform operations comprising:
determining whether the control flag is maintained in the shadow location;
writing the control flag to the shadow location if the control flag is not owned by the guest virtual machine and is maintained in the shadow location; and
exiting to a virtual machine monitor if the control flag is not owned by the guest virtual machine and is not maintained in the shadow location.

20. The article of manufacture of claim 19 wherein determining whether the control flag is maintained in a shadow location is performed only if the control flag is not owned by the guest virtual machine.

21. The article of manufacture of claim 19 wherein the machine-accessible medium further includes data that cause the processor to perform operations comprising testing a flag to determine whether the control flag is maintained in a shadow location.

22. A system comprising:
a processor;
a memory coupled to the processor, the memory selected from one of an SDRAM memory and an RDRAM memory, the memory to maintain a guest virtual machine context;
a processor control register that determines an operating mode of the processor, the processor control register including a control flag, the processor control register being outside the guest virtual machine context;
a first mask word in the guest virtual machine context, the first mask word to include a first flag in to indicate whether the control flag is owned by a guest virtual machine associated with the guest virtual machine context;
a shadow location in the guest virtual machine context;
an execution control unit to test the first flag and to cause a write of the control flag by the guest virtual machine to be directed to the processor control register if the control flag is owned by the guest virtual machine and to be redirected to the shadow location if the control flag is not owned by the guest virtual machine.

23. The system of claim 22, further comprising:
a second mask word in the guest virtual machine context, the second mask word to include a second flag in to indicate whether the control flag is maintained in the shadow location;
wherein the execution control unit is further
to cause a write of the control flag by the guest virtual machine to be redirected to the shadow location if the control flag is not owned by the guest virtual machine and is maintained in the shadow location, and to cause an exit to a virtual machine monitor if the control flag is not owned by the guest virtual machine and is not maintained in the shadow location.

24. The system of claim 23, wherein the execution control unit is responsive to the second flag only if the first flag indicates that the control flag is not owned by the guest virtual machine.

* * * * *